(12) United States Patent
Shimada

(10) Patent No.: US 8,867,083 B2
(45) Date of Patent: Oct. 21, 2014

(54) IMAGE PROCESSING APPARATUS AND ITS CONTROL METHOD FOR PROCESSING IMAGE DATA ACCORDING TO WHETHER A PROCESS INCLUDES AN INPUT JOB OR AN OUTPUT JOB

(71) Applicant: Canon Kabushiki Kaisha, Tokyo (JP)

(72) Inventor: Bungo Shimada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/971,110

(22) Filed: Aug. 20, 2013

(65) Prior Publication Data

US 2013/0335776 A1  Dec. 19, 2013

Related U.S. Application Data

(63) Continuation of application No. 11/419,911, filed on May 23, 2006, now Pat. No. 8,542,394.

(30) Foreign Application Priority Data

May 24, 2005  (JP) ................................. 2005-151611

(51) Int. Cl.
- *G06F 3/12* (2006.01)
- *H04N 1/00* (2006.01)
- *G06K 15/00* (2006.01)
- *H04N 1/32* (2006.01)

(52) U.S. Cl.
CPC .......... *G06K 15/401* (2013.01); *H04N 1/00877* (2013.01); *H04N 2201/3242* (2013.01); *H04N 2201/3288* (2013.01); *H04N 1/32363* (2013.01); *H04N 2201/3225* (2013.01); *H04N 1/00856* (2013.01); *H04N 2201/3226* (2013.01); *H04N 2201/3202* (2013.01); *H04N 1/32128* (2013.01); *H04N 1/32112* (2013.01); *H04N 1/32101* (2013.01); *H04N 2201/3249* (2013.01)
USPC ........... 358/1.15; 358/1.1; 358/403; 358/400; 358/402; 358/474; 726/1; 726/2; 726/3

(58) Field of Classification Search
USPC ................. 358/1.15, 1.1, 403, 400, 402, 474; 726/1–3
See application file for complete search history.

(56) References Cited

U.S. PATENT DOCUMENTS

| | | | | |
|---|---|---|---|---|
| 6,307,615 B1 * | 10/2001 | Ito | ................................... | 355/40 |
| 6,417,935 B1 * | 7/2002 | Saito et al. | .................... | 358/450 |
| 6,427,058 B1 * | 7/2002 | Akiba et al. | .................... | 399/82 |
| 6,466,329 B1 * | 10/2002 | Mukai | .......................... | 358/1.15 |
| 6,886,034 B2 * | 4/2005 | Blumberg | ..................... | 709/217 |
| 2002/0097443 A1 * | 7/2002 | Itoh | ............................... | 358/400 |

* cited by examiner

Primary Examiner — Benny Q Tieu
Assistant Examiner — Martin Mushambo
(74) Attorney, Agent, or Firm — Canon USA, Inc. IP Division

(57) ABSTRACT

An image processing apparatus includes a job execution unit configured to execute at least one of an input job accompanied by inputting of image data and an output job unaccompanied by inputting of image data, an image data storage unit configured to store image data in a predetermined memory, a reference information storage unit configured to store reference information to the image data stored in the memory in the same memory, and a control unit configured to control the image data storage unit to newly store image data in the memory when the job executed by the job execution unit is an input job, and the reference information storage unit to store the reference information to the image data stored in the memory without newly storing image data in the memory when the job executed by the job execution unit is an output job.

15 Claims, 14 Drawing Sheets

FIG.4

| | TAG NAME | ITEM | EXAMPLE 1 |
|---|---|---|---|
| 4001 | JobKind | JOB KIND | PDL-PRINT |
| 4002 | JobName | JOB NAME | Word-Document |
| 4003 | ClientName | JOB CLIENT | SUZUKI Hajime |
| 4004 | CharacterCode | CHARACTER CODE INFORMATION | Shift_JIS |
| 4005 | SectionNo | SECTION CODE | 1054 |
| 4006 | StartTime | JOB START TIME (COMMUNICATION START TIME) | 2004/10/15 08:05:40 |
| 4007 | EndTime | JOB END TIME (COMMUNICATION END TIME) | 2004/10/15 08:10:30 |
| 4008 | Result | JOB END RESULT | OK |
| 4009 | ResourceCount | RESOURCE COUNT PER COPY | 10 |
| 4010 | Copies | NUMBER OF COPIES | 5 |
| 4011 | Protocol | COMMUNICATION METHOD | LPR |
| 4012 | ComType | COMMUNICATION TYPE | - |
| 4013 | LineInfo | USED LINE NUMBER | - |
| 4014 | NoticeAddress | TRANSMISSION (RECEPTION) SIDE ADDRESS, TELEPHONE NUMBER | - |
| 4015 | ComAbbreviation | TRANSMISSION (RECEPTION) SIDE NAME | - |
| 4016 | Subject | SUBJECT | - |
| 4017 | PathName | IMAGE PATH NAME (IMAGE STORAGE SIDE INFORMATION) | - |
| 4018 | DeviceName | DEVICE NAME | CENTER-MFP5 |
| 4019 | DeviceSerialNo | DEVICE SERIAL NUMBER | MKJJ001234 |
| 4020 | DeviceAddress | DEVICE ADDRESS | 88.125.9.45 |
| 4021 | DocumentID | DOCUMENT ID | MKJJ0012340410150805400000001589 |

FIG.5

|  | EXAMPLE 1 | EXAMPLE 2 |
|---|---|---|
| 5001 | I-FAX | FAX |
| 5002 | - | - |
| 5003 | - | TACHIBANA Akira |
| 5004 | Shift_JIS | Shift_JIS |
| 5005 | - | 0332 |
| 5006 | 2004/10/16 20:10:22 | 2004/10/16 21:10:24 |
| 5007 | 2004/10/16 20:11:30 | 2004/10/16 21:15:30 |
| 5008 | Canceled | OK |
| 5009 | 1 | 4 |
| 5010 | 1 | 1 |
| 5011 | I-FAX | FAXG3 |
| 5012 | Receive | Send |
| 5013 | - | 0447336111 |
| 5014 | xxxyyy@zzzcompany.com | 0337582111 |
| 5015 | Thomas Anderson | Head Office |
| 5016 | Shipping document | - |
| 5017 | /IFAX/HOME/05/ | - |
| 5018 | CENTER-MFP5 | CENTER-MFP5 |
| 5019 | MKJJ001234 | MMJJ001234 |
| 5020 | 88.125.9.45 | 88.125.9.45 |
| 5021 | MKJJ0012340410162010220000001592 | MKJJ0012340410162110240000001593 |

FIG.7

| JOB KIND (7001) | JOB TYPE (7002) | RECORDING OF REAL IMAGE (7003) |
|---|---|---|
| COPY JOB (7101) | INPUT JOB (7102) | YES (7103) |
| PDL-PRINT JOB (7201) | INPUT JOB (7202) | YES (7203) |
| SCAN JOB/BOX STORAGE JOB (7301) | INPUT JOB (7302) | YES (7303) |
| RECEPTION JOB (FAX/I-FAX) (7401) | INPUT JOB (7402) | YES (7403) |
| TRANSMISSION JOB (FAX/I-FAX/SEND) (7501) | OUTPUT JOB (7502) | NO (7503) |
| BOX-PRINT JOB, RECEPTION PRINT JOB (7601) | OUTPUT JOB (7602) | NO (7603) |

IMAGE PROCESSING APPARATUS AND ITS CONTROL METHOD FOR PROCESSING IMAGE DATA ACCORDING TO WHETHER A PROCESS INCLUDES AN INPUT JOB OR AN OUTPUT JOB

CROSS-REFERENCE TO RELATED APPLICATIONS

This application is a Continuation of co-pending U.S. patent application Ser. No. 11/419,911 filed May 23, 2006, which claims the priority benefit of Japanese Patent Application No. 2005-151611 filed May 24, 2005. The disclosures of the above-named applications are hereby incorporated by reference herein in their entirety.

BACKGROUND OF THE INVENTION

1. Field of the Invention

The present invention relates to history management of information, and more particularly to an image processing apparatus for recording and managing image data input/output therein, and its control method.

2. Description of the Related Art

With increasing popularity of an image processing apparatus, anybody can now easily copy or transmit a document by using the image processing apparatus. However, while convenience is enhanced for a user, information leakage such as copying or transmission of classified documents has become a serious problem.

As a countermeasure to such a problem, an image processing system is known which stores in a recording device all read image data, prints, or image data transmitted during copying or transmission and thereby enables checking of a date, a place and a person concerning the processing, and the type of the processing from the data stored in the recording device. When images are managed by such a system, a system manager can investigate/trace an image processing apparatus which has processed an information-leaked document by checking target image data (e.g., see JP A 7-212602).

However, in the conventional information processing system, as all the input/output image data are stored in the recording device, recording efficiency is poor, and a problem of quick consumption of the storage capacity of the recording device arises if a real image is recorded every time during BOX printing or broadcast transmission. Thus, a large storage capacity recording device is necessary to store the image data.

SUMMARY OF THE INVENTION

The present invention has been developed with the aforementioned problems in mind, and it is an object of the invention to provide an image processing apparatus which can efficiently record input/output data and reference information thereof in a security unit, and its method.

According to an aspect of the present invention, an image processing apparatus includes a job execution unit configured to execute at least one of an input job accompanied by inputting of image data and an output job unaccompanied by inputting of image data, an image data storage unit configured to store image data input by execution of a job in a predetermined memory separately from the execution of the input job in conjunction with the execution of the job by the job execution unit, a reference information storage unit configured to store reference information to the image data stored in the memory in the same memory separately from the execution of the job in conjunction with the execution of the job by the job execution unit, and a control unit configured to control the image data storage unit to newly store image data input by the execution of the input job in the memory when the job executed by the job execution unit is an input job, and the reference information storage unit to store the reference information of the image data stored in the memory without newly storing image data handled by an output job in the memory by the image data storage unit when the job executed by the job execution unit is an output job.

According to another aspect of the present invention, a method of controlling an image processing apparatus includes a job execution step of executing at least one of an input job accompanied by inputting of image data and an output job unaccompanied by inputting of image data, an image data storage step of storing image data input by execution of a job in a predetermined memory separately from the execution of the input job in conjunction with the execution of the job by the job execution step, a reference information storage step of storing reference information to the image data stored in the memory in the same memory separately from the execution of the job in conjunction with the execution of the job by the job execution step, and a control step of controlling the image data storage step to newly store image data input by the execution of the input job in the memory when the job executed by the job execution step is an input job, and the reference information storage step to store the reference information of the image data stored in the memory without newly storing image data handled by an output job in the memory by the image data storage step when the job executed by the job execution step is an output job.

According to yet another aspect of the present invention, a computer readable storage medium is provided which stores a program for causing an image processing apparatus to execute the control method or a computer program for causing a computer to execute the control method.

According to the present invention, the image processing apparatus can efficiently record the input/output image data and reference information thereof in the security unit, and facilitate retrieving/tracing of the image data.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments.

FIG. 4 is a diagram showing an example of a history record stored in the history management server 1006.

FIG. 5 is a diagram showing an example of a history record stored in the history management server 1006.

FIG. 7 is a diagram showing a method of storing an image in the security unit for each job kind.

DETAILED DESCRIPTION OF THE EMBODIMENTS

Figure 1:
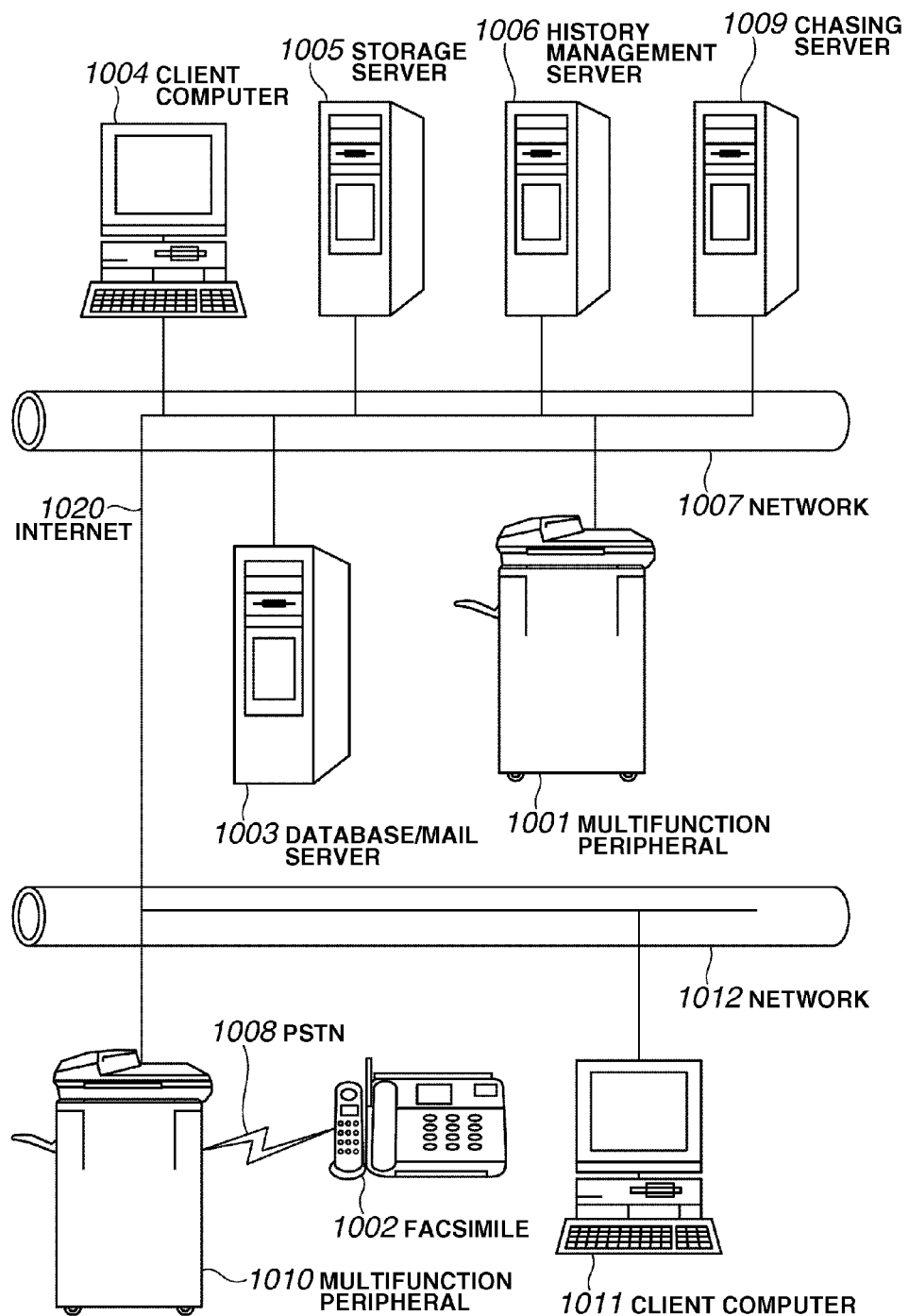
FIG. 1 is a diagram showing a configuration of a basic image processing system which includes an image processing apparatus according to a first embodiment of the present invention.

The following description of exemplary embodiment (s) is/are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, circuit patterns deposited on a substrate may be discussed, however these systems and the methods to fabricate these system as known by one of ordinary skill in the relevant art is intended to be part of the enabling disclosure herein where appropriate.

Note that similar reference numerals and letters refer to similar items in the figures, and thus once an item is defined in one figure, it may not be discussed for following figures.

Exemplary embodiments will be described in detail below in accordance with the accompanying drawings.

First Embodiment

FIG. 1 is a diagram showing a configuration of a basic image processing system which includes an image processing apparatus according to a first embodiment of the present invention.

In FIG. 1, multi function peripherals (MFP) 1001 and 1010 are devices for reading, copying and printing a document, transmitting images to various devices, and receiving images from various devices. A database/mail server 1003 is a computer in which an application is operated to store data read by the MFP's 1001 and 1010. A client computer 1004 is a computer connected to the database/mail server 1003 to download and display the stored data. The client computer 1004 can instruct necessary printing to the MFP's 1001 and 1010.

A storage server 1005 is a monitoring storage device for storing image data input/output from the MFP's 1001 and 1010. A history management server 1006 records history (log) regarding executions of a copying operation, a printing operation, and a transmission operation of the MFP's 1001 and 1010 and reference information of an image stored in the storage server 1005. A chasing server 1009 is a server for obtaining and recording data of the storage server 1005 and the history server 1006. According to the image processing system, under an environment where the plurality of MFP's, the storage server, and the history server are present, by installing the chasing server, data for security management that accompanies the operations of the MFP's 1001 and 1010 can be unitarily managed. The storage server 1005, the history management server 1006, and the chasing server 1009 may be configured as separate devices, or some thereof may be integrated in one device.

A network 1007 is a network such as Ethernet (registered trademark) to which the MPF 1001, the database/mail server 1003, the client computer 1004, the storage server 1005, the history management server 1006, and the chasing server 1009 are connected.

The MFP's 1001 and 1010 incorporate the same functions as those of the storage server 1005 and the history management server 1006, and include a monitoring storage device for storing all image data input/output by the MFP's 1001 and 1010, and a history recording device for recording history of the copying operation and the transmission operation thereof.

A client computer 1011 is connected to the MFP 1010 to instruct print outputting or Internet faxing (IFAX). A network 1012 is a network such as Ethernet (registered trademark) to which the MFP 1010 and the client computer 1011 is connected. A facsimile 1002 is a facsimile device for receiving data read by the MFP 1010 through a public switched telephone network (PSTN) 1008 to print it. The facsimile 1002 can transmit image data to the MPF 1010 through the PSTN 1008. The networks 1007 and 1012 such as Ethernet (registered trademark) are interconnected through Internet 1020.

Figure 2:
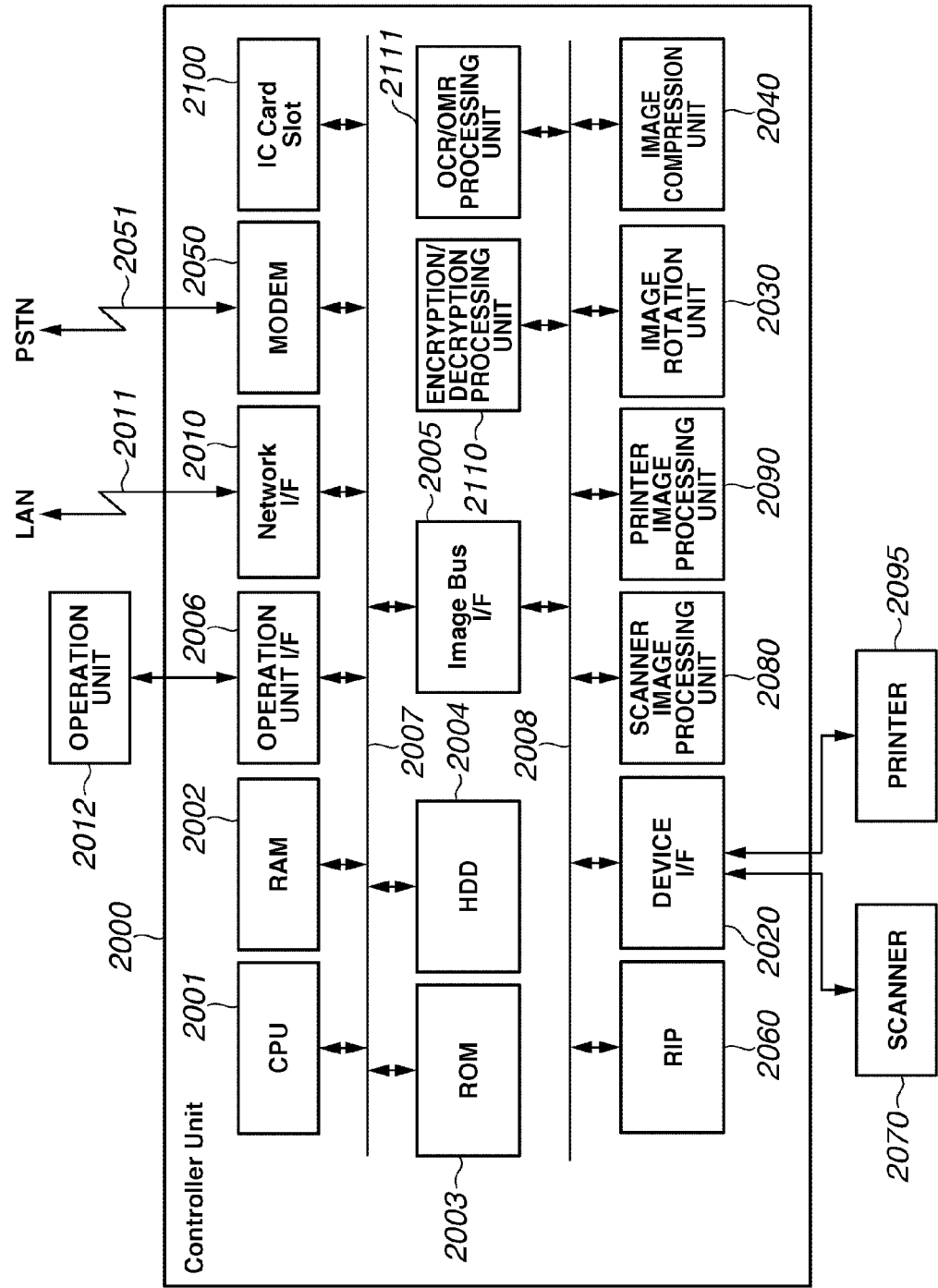
FIG. 2 is a block diagram showing a detailed configuration of the image processing system of the first embodiment mounted in a copying machine 1001 or 1010.

FIG. 2 is a block diagram showing a detailed configuration of the image processing system of the first embodiment mounted in the MFP 1001 or 1010.

In FIG. 2, a controller unit 2000 is connected to a scanner 2070 which is an image input device and a printer 2095 which is an image output device, and to a LAN 2011 and a PSTN 2051 to input/output image information or device information.

In the controller unit 2000, a CPU 2001 is a controller for controlling the entire system. A RAM 2002 is a system work memory for operating the CPU 2001, i.e., an image memory for temporarily storing image data. A ROM 2003 is a boot ROM to store a boot program of the system. A HDD 2004 is a hard disk drive for storing system software and image data. A history record and image data for tracing investigation at the time of secret leakage described below are temporarily stored in the HDD 2004. An operation unit I/F 2006 is an interface unit with an operation unit (UI) 2012 having a touch panel, and outputs an image to be displayed in the operation unit 2012 thereto. The operation unit I/F 2006 plays a role of transmitting information input by a system user from the operation unit 2012 to the CPU 2001.

A network I/F 2010 is connected to the LAN 2011 (equivalent to network 1007 or 1012 of FIG. 1) to input/output information. A modem 2050 is connected to the PSTN 2051 to input/output information. The above devices are arranged on a system bus 2007.

An image bus I/F 2005 is a bus bridge for connecting the system bus 2007 to an image bus 2008 for transferring image data at a high speed, and for converting a data structure. The image bus 2008 is constituted, for example, by a PCI bus or IEEE 1394.

The following devices are arranged on the image bus 2008. A raster image processor (RIP) 2060 rasterizes page description language (PDL) codes transmitted from the client computers 1004 and 1011 to bitmap images. A device I/F unit 2020 connects a scanner 2070 which is an image input/output device and a printer 2095 to the controller unit 2000, and executes conversion processing to transfer image data. A scanner image processing unit 2080 corrects, processes or edits image data input from the scanner unit 2070. A printer image processing unit 2090 executes correction, resolution conversion or the like for printer output image data according to characteristics of the printer unit 2095. An image rotation unit 2030 rotates image data. An image compression unit 2040 executes JPEG compression/decompression processing for multivalued image data, and JBIG, MMR or MH compression/decompression processing for binary image data.

An IC card slot 2100 executes user authentication by an IC card medium. By this user authentication, a user is specified when executing a job. By inputting a proper personal identification number (PIN) code after insertion of the IC card medium, a key used for encryption/decryption can be input/output. An encryption/decryption processing unit 2110 is a hardware accelerator board for encrypting/decrypting data by using the key of the IC card slot 2100 or a key unique to the device. An OCR/OMR processing unit 2111 decodes character information or a two-dimensional barcode contained in the image data to convert it into a character code.

The MFP 1001 or 1010 is configured as described above, and capable of executing a plurality of functions such as a COPY job, a PDL print job, a SCAN job, a BOX storage job, a FAX (I-FAX) reception job, a FAX transmission job, a SEND job, a reception print job, and a BOX print job. Each job will be described below in detail.

Figure 3:
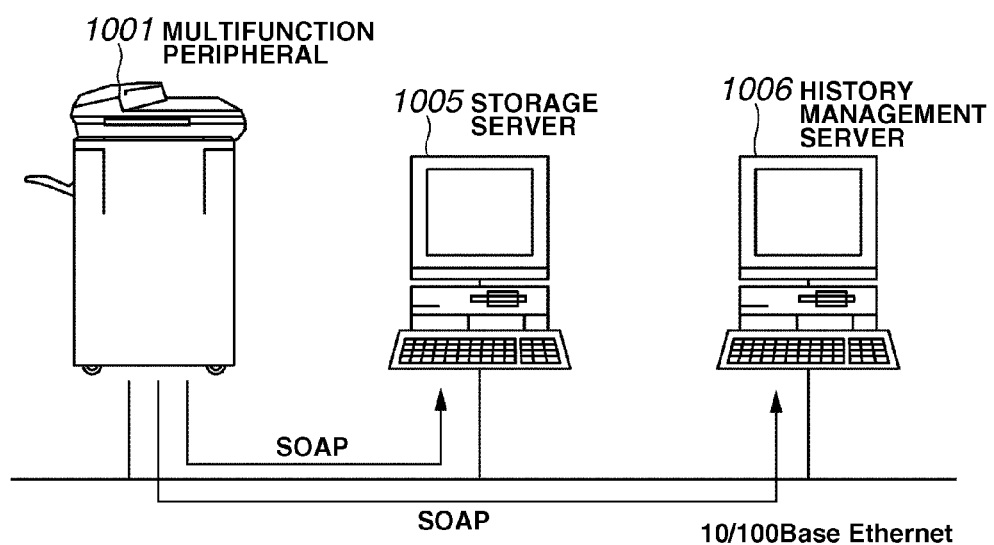
FIG. 3 is a diagram showing a configuration when the copying machine 1001 of the first embodiment writes image data in a storage server 1005 and a history record in a history management server 1006.

FIG. 3 shows a configuration example when the MFP 1001 of the first embodiment writes the image data in the storage server 1005 and the history record in the history management server 1006. In the description below, the MFP's 1001 and 1010 will be identical in configuration, and description of the MFP 1001 will be applied to the MFP 1010 unless specified otherwise. The history record is history information generated in conjunction with execution of the above jobs by the MFP 1001. The image data transmitted from the MFP 1001 to the storage server 1005 is used for checking which image has been input/output by the above jobs. For example, when leakage of a classified image is detected, an image of the storage server 1005 is used by the manager or the like to investigate a cause of the leakage. In the configuration example of FIG. 3, Ethernet (registered trademark) is used, and a simple object access protocol (SOAP) is used for transferring the image data from the MFP 1001 to the storage server 1005. Other existing protocols may be used for transferring the image data. When necessary, encryption processing that uses, for example, a secure sockets layer (SSL) may be used. Further, the data in the storage server 1005 may be subjected to processing such as encryption and stored.

In the configuration example of FIG. 3, the SOAP is used for writing the history record from the MFP 1001 to the history management server 1006. However, an existing logging protocol such as syslog may be used as an alternative. When necessary, encryption processing that uses, for example, SSL may be executed. The data in the history management server 1006 may be encrypted and stored.

According to the embodiment, the MFP 1001, the storage server 1005, and the history management server 1006 are separately configured. However, one or all of them may be integrated in one device. Setting information necessary for accessing the storage server 1005 and the history management server 1006 is protected so that it can be set to the MFP 1001 only by the system manager of the MFP 1001.

Each of FIGS. 4 and 5 shows an example of a history record stored in the history management server 1006. Items of the history record described below are recorded in conjunction with jobs executed by the MFP's 1001 and 1010. The items include an item recorded before job execution, an item recorded during execution, and an item recorded after execution completion. In FIG. 4, lines indicated by 4001 to 4021 are items, and description thereof is in an item column. A tag name column is a tag name for each item to identify data.

4001 is an item of a job kind, indicating a job kind such as COPY, FAX or PDL. A tag name becomes "JobKind". 4002 is an item of a job name, indicating a job name of an executed job. A tag name is "JobName". 4003 is an item of a job client, indicating a user name who has instructed job execution. A tag name is "ClientName". 4004 is an item of character code information, indicating character code information used for the record. A tag name is "CharacterCode".

4005 is an item of a section code, indicating a section number to which the user who has instructed the job execution belongs. A tag name is "SectionNo". 4006 is an item of a job start time, indicating a job start time of a recording target job of the history record. A tag name is "StartTime". 4007 is an item of a job end time, indicating an end time of the recording target job of the history record. A tag name is "EndTime". 4008 is an item of a job end result, indicating a content of job end result such as OK or Canceled. A tag name is "Result". 4009 is an item of a resource count per copy, indicating the number of pages of a job. A tag name is "ResourceCount". 4010 is an item of the number of copies, indicating a setting as to the number of copies to be output. A tag name is "Copies".

4011 is an item of a communication method, indicating a kind of a communication method. A tag name is "Protocol". 4012 is an item of a communication type, indicating transmission or reception. A tag name is "ComType". 4013 is an item of a used line number, indicating a used telephone number or the like. A tag name is "LineInfo". 4014 is an item of a transmission/reception side address, indicating an address or a telephone number of the opposite side. A tag name is "NoticeAddress". 4015 is an item of a transmission/reception side name, indicating a named of a job opposite side. A tag name is "ComAbbreviation".

4016 is an item of a subject, indicating a subject in an e-mail transmission/reception job or the like. A tag name is "Subject". 4017 is an item of an image path name, indicating an image storage side in an image storage job. A tag name is "PathName". 4018 is an item of a device name, indicating a name attached to a device. A tag name is "DeviceName". 4019 is an item of a device serial number, indicating a serial number unique to a device. A tag name is "DeviceSerialNo". 4020 is an item of a device address, indicating an IP address or the like of a device. A tag name is "DeviceAddress".

4021 is an item of a document ID for specifying a document to be treated by a job. By arraying a plurality of document ID's, a plurality of documents can be represented. A tag name is "DocumentID". The document ID is represented by an ASCII character string of totally 32 digits of "device serial number" (10 digit ASCII)+"document generation time yymmddhhmmss" (12 digit ASCII)+"serial number incremented for each job by device (10 digit ASCII)". The items 4001 to 4021 are not necessarily used. When not used, items are recorded as having no contents.

Items shown in FIG. 5 are similar to those of FIG. 4, and lines of 5001 to 5021 correspond to the lines of 4001 to 4021. Job kinds indicated by 4001, and 5001e are different in examples 1, 2 and 3, and items used according to job kinds or the like also vary. For example, in a FAX job of the example 3, a telephone number of an own device is recorded in the item 5013, and an opposite side telephone number is recorded in the transmission/reception side address of the item 5014.

Figure 6:
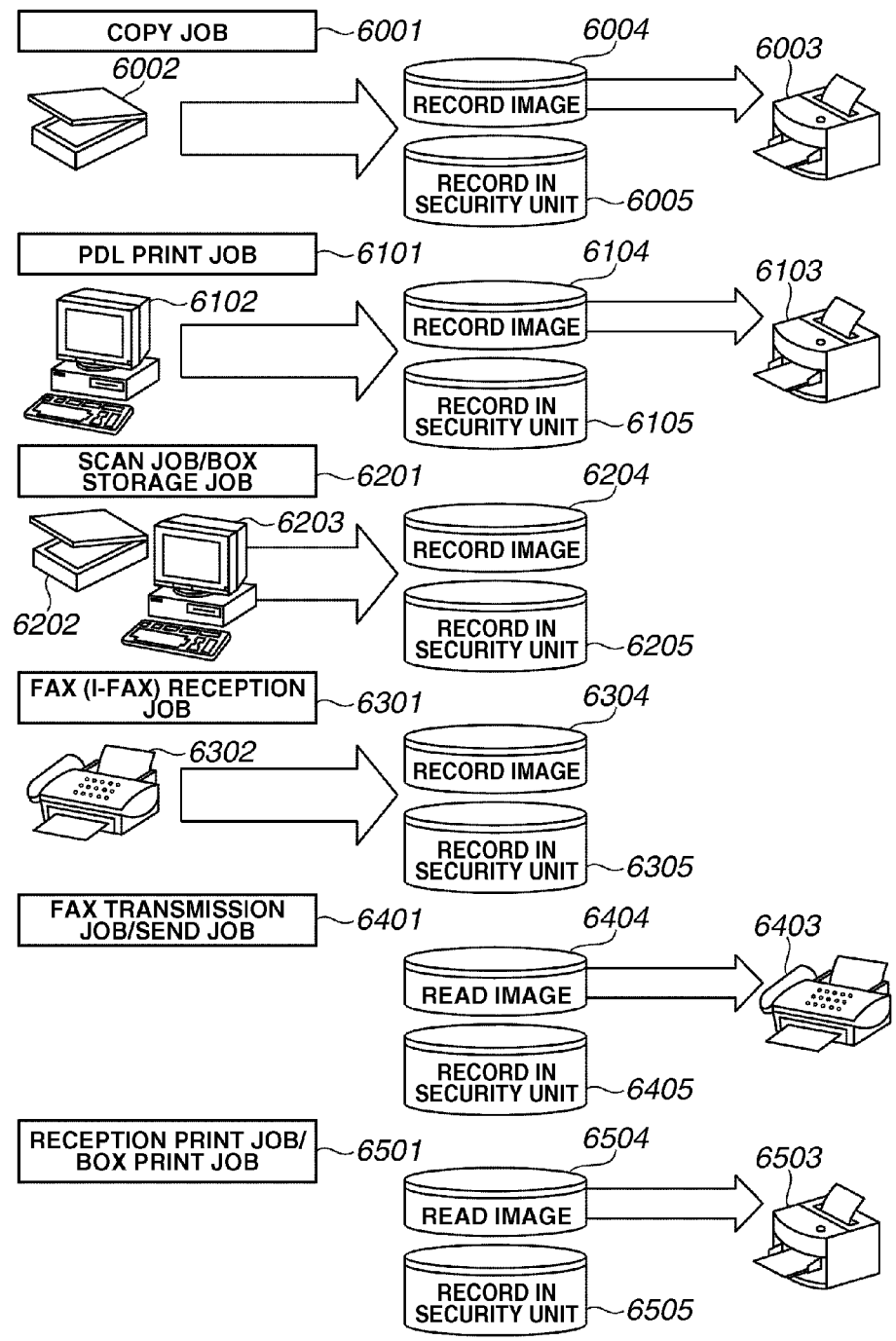
FIG. 6 is a diagram showing a data flow for each job kind according to the first embodiment.

FIG. 6 shows a data flow for each job kind according to the first embodiment. In FIG. 6, scanners 6002 and 6202 correspond to the scanner 2070, and printers 6003, 6103 and 6503 correspond to the printer 2095 of FIG. 2. HDD's 6004, 6104, 6204, 6404, and 6504 correspond to the HDD 2004 of FIG. 2.

In FIG. 6, a COPY job 6001 temporarily stores an image read from the scanner 6002 in the HDD 6004, and outputs it to the printer 6003. During job execution, the history record described above with reference to FIGS. 4 and 5 and the image read from the scanner 6002 are recorded in a security unit 6005. The security unit is a generic name of the storage server 1005 and the history management server 1006 (similar in the security units 6105, 6205, 6305, 6405, and 6505).

A PDL print job 6101 rasterizes PDL data sent from a host computer 6102 to create an image. The rasterized image is temporarily recorded in the HDD 6014, and output to the printer 6103. During job execution, the history record described above with reference to FIGS. 4 and 5 and the rasterized image are recorded in the security unit 6105.

A SCAN job or a BOX storage job 6201 records the image sent from the scanner 6202 or the image obtained by rasterizing the PDL data sent from the host computer 6023 in the HDD 6204. During job execution, the history record described above with reference to FIGS. 4 and 5 and the input image are recorded in the security unit 6205. The image recorded in the HDD 6204 by this job can be printed or transmitted later.

A FAX reception job or an I-FAX reception job 6301 records an image sent from a transmission terminal 6302 of a FAX or the like of the opposite side in the HDD 6304. During job execution, the history record described above with reference to FIGS. 4 and 5 and the image received from the FAX or the like 6302 of the opposite side are recorded in the security unit 6305. The image recorded in the HDD 6304 by this job can be printed or transmitted later.

In the case of executing a job for reading an original image to transmit FAX/I-FAX or transmitting an image by e-mail or a protocol such as file transfer protocol (FTP) or a server message block (SMB), it is seemingly a single FAX/I-FAX transmission job or a SEND job. According to the embodiment, however, it is treated as a job constituted of two kinds of jobs, i.e., a SCAN job or a reception job and a FAX/I-FAX job internally.

The FAX/I-FAX transmission job or the SEND job 6401 reads an image stored in the HDD 6404 by the SCAN job 6201 or the reception job 6301 to transmit it to a device 6403 of the opposite side. During job execution, the history record described above with reference to FIGS. 4 and 5 and reference information of the image transmitted to the device 6403 of the opposite side are recorded in the security unit 6405. In this case, by recording reference information for uniquely specifying the image previously recorded in each of the security units 6205 and 6305 without recording a real image during recording in the security unit 6405, a processing speed is increased and the amount of recording is reduced without recording the same image many times. The SEND job is a generic name of a job image-transmitted by e-mail or a protocol such as FTP or SMB.

A reception print job/BOX print job 6501 reads the image stored in the HDD 6504 by the job 6201 or 6301 to output it to the printer 6503. The execution of the job 6501 is accompanied by recording of the history record described above with reference to FIGS. 4 and 5 and reference information of the image output to the printer 6503 in the security unit 6505. In this case, by recording reference information for uniquely specifying the image previously recorded in each of the security units 6205 and 6305 without recording a real image during recording in the security unit 6505, a processing speed is increased and the amount of recording is reduced without recording the same image many times.

By combining the jobs, it is possible to print a FAX-received document, and to transmit a scan image read by the SCAN job by FAX.

FIG. 7 shows a method of storing an image in the security unit for each job kind. In FIG. 7, a column of a job kind 7001 indicates a job kind such as COPY or PDL print. A column of a job type 7002 indicates a job type such as an input job or an output job of an image. A column of real image recording 7003 indicates setting as to a job for recording a real image in the security unit or a job for recording only reference information to a real image without recording the real image. This table is stored in the HDD 2004 or the ROM 2003 of each of the MFP's 1001 and 1010.

In this case, in the COPY job 7101, the job type 7002 is an "input job" 7102 accompanied by image inputting. Accordingly, the real image recording 7003 is "YES" 7103.

In the PDL-PRINT job 7201, the job type 7002 is an "input job" 7202 accompanied by image inputting. Accordingly, the real image recording 7003 is "YES" 7203.

In the SCAN job/BOX storage job 7301, the job type 7002 is an "input job" 7302 accompanied by image inputting. Accordingly, the real image recording 7003 is "YES" 7303.

In reception job 7401, the job type 7002 is an "input job" 7402 accompanied by image inputting. Accordingly, the real image recording 7003 is "YES" 7403.

In the transmission job 7501, the job type 7002 is an "output job" 7502 of only image outputting unaccompanied by image inputting (document reading operation during FAX/I-FAX transmission/SEND is treated as a SCAN job). Accordingly, the real image recording 7003 becomes "NO" 7503. Hence, the transmission job 7501 records reference information of the image in place of the real image.

In the BOX print job/reception print job 7601, the job type 7002 is an "output job" 7602 of only image outputting unaccompanied by image inputting. Accordingly, the real image recording 7003 becomes "NO" 7603. Hence, the BOX print job/reception print job 7601 records the reference information of the image in place of the real image.

Figure 8:
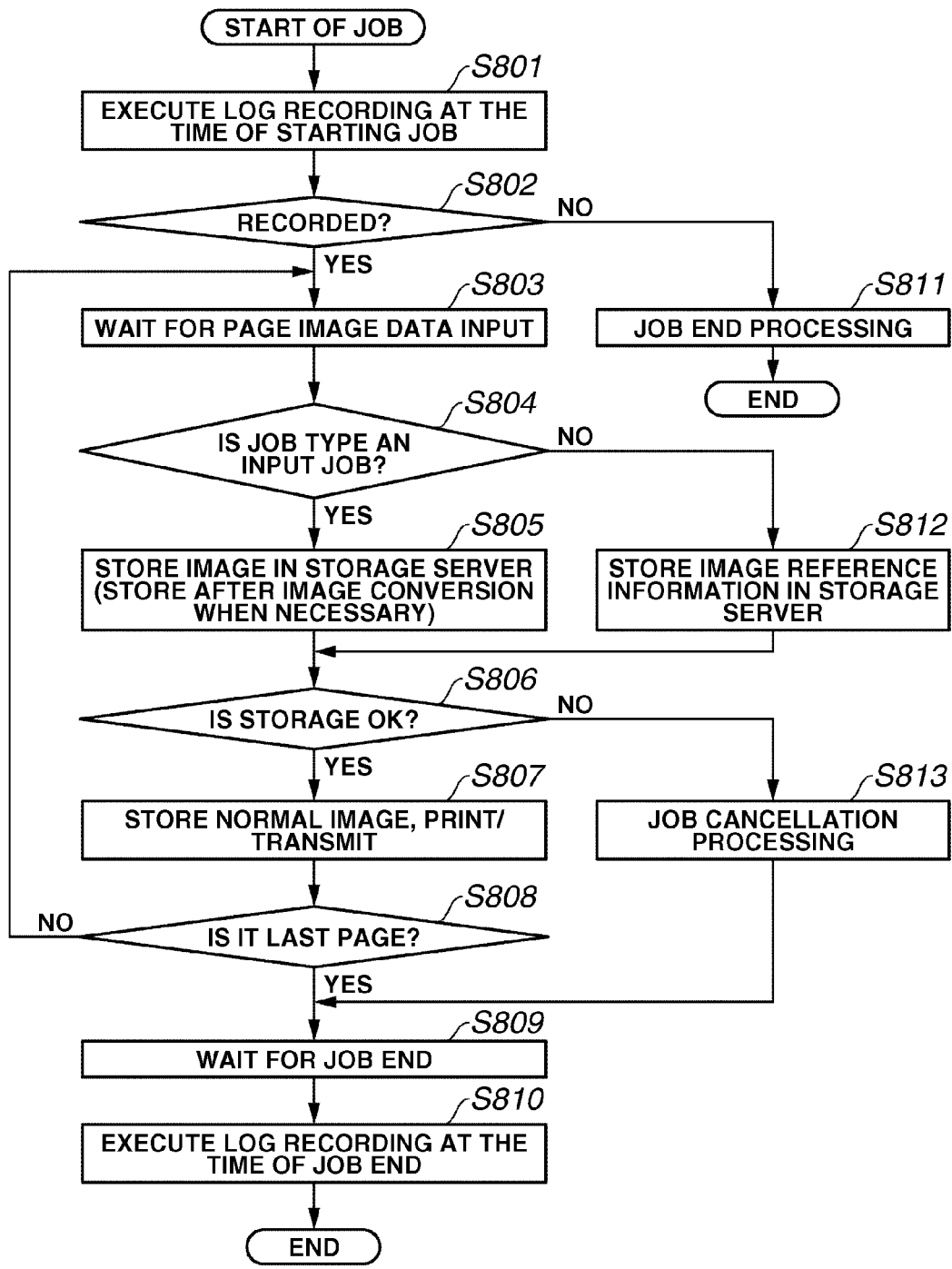
FIG. 8 is a flowchart showing a procedure during job execution in the image processing system of the first embodiment.

FIG. 8 is a flowchart showing a processing procedure during job execution in the image processing system of the first embodiment. This process is executed by the CPU 2001 of the MFP 1001 or 1010. First, upon a start of a job, log-recording of a job start time is executed (step S801). In this case, an area necessary for the log-recording is secured, and currently established items of the history record stored in the history management server 1006 are written in the HDD 2004. Among the items of the history record, the items established at the job start time are, for example, a job kind (JobKind) 4001, a job client (ClientName) 4003, a document ID (DocumentID) 4021, and the like. The item of the document ID 4021 is especially important, which becomes information for specifying by a document unit an image stored in the storage server 1005. For example, when it is a new document regarding a job kind whose job type is an input job, a new document ID is generated. An item indefinite at the job start time is subjected to writing processing at a job end time. Additionally, an area for items to be written at the job end time is secured here.

Next, judgment is made as to whether the log-recording has normally been executed (step S802). As a result, if it is judged that the log-recording has not normally been executed or a necessary area has not been secured (No), job end processing is executed without continuing the job execution (step S811). Then, upon completion of the job end processing, the process of the flowchart is finished. On the other hand, if it is judged in the step S802 that the necessary area has been secured and the log-recording has normally been executed (Yes), the process proceeds to step S803.

In the step S803, the process waits for inputting of image data. When an image of one page is inputted, the process proceeds to step S804. When the job type 7002 is an output job, the processing of the step S803 becomes image reading from the HDD 2004.

In step S804, reference is made to the table of FIG. 7 to judge whether the job type 7002 is an input job. As a result, if it is judged that the job type 7002 is an input job such as a COPY job, a BOX storage job or a reception job (Yes), the process proceeds to step S805. On the other hand, if it is judged that the job type 7002 is an output job such as a transmission job or a BOX print job (No), the process proceeds to step S812. In the case of the output job, without recoding a real image, the input job previously executed to process the same document, log-records the same ID as the document ID 4021 stored in the storage server 1005 in the step S801, so that reference information of the document is recorded. Accordingly, the image processed by the output job can be specified. Upon completion of the processing of the step S812, the process proceeds to step S806.

In step S805, the job type 7002 executes an input job. In other words, the image input in the step S803 is stored in the storage server 1005. In this case, an image ID which becomes unique for each page is added. When necessary, resolution conversion or color mode conversion for making a color image black and white is executed, whereby an image data size can be compressed. The image ID is represented by an ACSII character string of totally 32 digits of "device serial number" (10 digit ASCII)+"image recording time yymmddh-hmmss" (12 digit ASCII"+"serial number incremented by device for each image recording (10 digit ASCII). In the step S805, the image data may be temporarily stored in the HDD 2003 of the MFP instead of storing in the storage server 1005. In this case, the image data stored in the HDD 2004 is transferred to the storage server 1005 by predetermined different timing.

Next, in the step S806, judgment is made as to whether the data has been stored in the storage device 1005 or the HDD 2004. As a result, the process proceeds to step S807 if the storage is performed (Yes), or to step S813 if the data has not been stored (No). In the step S813, cancellation processing of the job is executed to proceed to step S809. Through this processing, it is possible to prevent transmission or printing/outputting of the image that has not been stored in the storage server 1005.

In the step S807, the image input in the step S803 is stored in the HDD 2004. The processing of the BOX storage job, the SCAN job and the reception job is finished upon storage in the HDD 2004. However, in the case of the COPY job and the PDL print job, print output processing to the printer 2095 is executed. In the case of the transmission job, transmission processing that uses the network I/F 2010 or the modem 2050 is executed.

As the image storage in the storage server 1005 is checked in the step S806, the image printed or transmitted is always stored in the security unit, thereby enabling investigation when secret leakage is detected later. When the processing of the step S807 ends, the process proceeds to step S808. In the step S808, judgment is made as to whether the image received in the step S803 is a last page. As a result, the process proceeds to step S809 if it is a last page (Yes), or returns to the step S803 to wait for a next image when it is not a last page (No).

In the step S809, the process waits for a job end. Then, in step S810, log-recording processing of an item that could not be written because of its indefiniteness in the step S801 such as a job end result 4008 is executed for the history management server 1006. When the log-recording ends, the process of the flowchart comes to an end.

Figure 9:
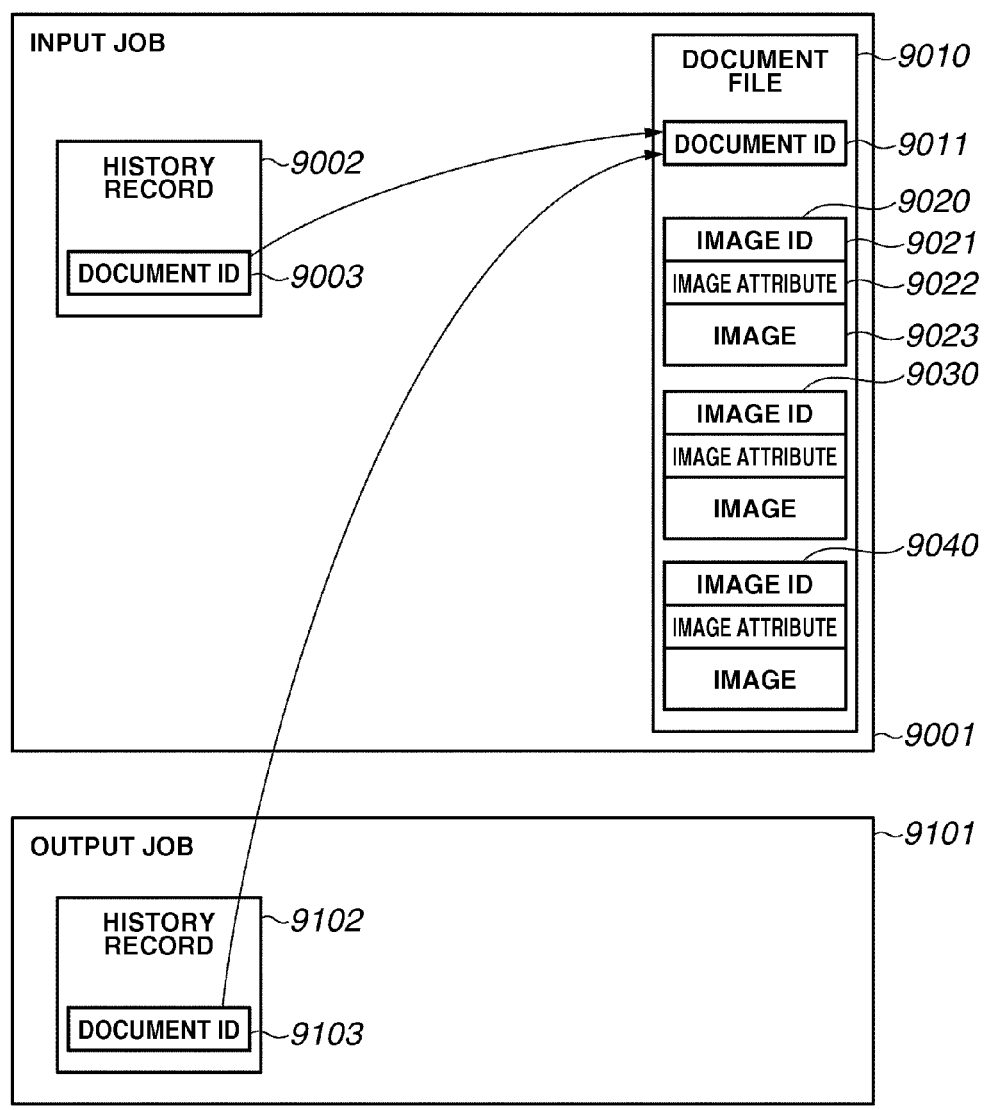
FIG. 9 is a diagram showing an example of writing in the history management server 1006 and the storage server 1005 according to the first embodiment.

FIG. 9 shows an example of writing in the history management server 1006 and the storage server 1005 according to the first embodiment of the present invention. In FIG. 9, in an input job 9001, the job type 7002 is an input job, e.g., a BOX storage job 7301. In an output job 9101, the job type 7002 is an output job, e.g., a BOX-PRINT job 7601. In other words, the output job 9101 is a job for outputting an image input by the input job 9001.

As shown in FIG. 9, the input job 9001 records a history record 9002 in the history management server 1006, and a document file 9010 in the storage server 1005. The history record 9002 is constituted of items including a document ID 9003 described above with reference to FIG. 4. The document file 9010 is constituted of a document ID 9011 and image data 9020, 9030, and 9040. Three data are present in FIG. 9, but the number of image data may vary depending on job kinds. The document ID 9011 and the document ID 9003 are identical ID's. Accordingly, the document file 9010 is linked with the history record 9002 to represent a correspondence. The image data 9020 is written in the storage server 1005 in the step S805, and constituted of an image ID 9021, an image attribute 9022, and an image 9023. The image ID is an ID unique for each real image, and the image attribute 9022 is an image format or the like of the image 9023. The image 9023 is an image itself. In the storage server 1005, one document contains one file, and a plurality of pages (images) can be provided. There is one unique document ID 9011 for one document.

The output job 9101 records a history record 9102 in the history management server 1006. There is no document file to be recorded by the output job. By recording the same value of the document ID 9103 as that of the document ID 9011 recorded in the previous job, the document output by the output job 9101 is represented. By this method, as no image recording occurs in the storage server 1005 during outputting, it is possible to reduce the amount of recording, and to prevent a reduction in job execution speed.

As described above, by the configuration and the processing of the image processing apparatus according to the first embodiment which performs reference information management by document units, a date, a place, and a person of processing, and a type of processing can be efficiently recorded. It is accordingly possible to limit a reduction in job execution speed to a minimum and to execute and record a great volume of jobs in the security unit.

Second Embodiment

A second embodiment of the present invention will be described below. A basic system configuration, a basic system block diagram, a configuration of a security unit, recorded contents of a history record, data flowchart of each job, and an image storing method of the second embodiment are similar to those of the first embodiment described above with reference to FIGS. 1 to 7, and thus description thereof will be omitted.

A processing procedure during job execution according to the second embodiment will be described below by using a flowchart of FIG. 8. The processing procedure during job execution according to the second embodiment is similar to that of the first embodiment except some parts. Parts of the processing procedure different from that of the first embodiment will be described below.

According to the second embodiment, reference information of an image is managed by an image page unit. Thus, in step S812, differently from the first embodiment, an input job that has input the same image as was previously executed, records in a storage server 1005 the same image ID as was stored in the storage server 1005. Accordingly, an image processed by an output job can be specified. Then, when the processing of the step S812 ends, the process proceeds to step S806.

In step S805, a job type 7002 processes the input job. In other words, the image received in step S803 is stored in the storage server 1005. In this case, an image ID unique for each page is added. When necessary, resolution conversion or color mode conversion for making a color image black and white is executed, thereby enabling compression of an image data size.

Figure 10:
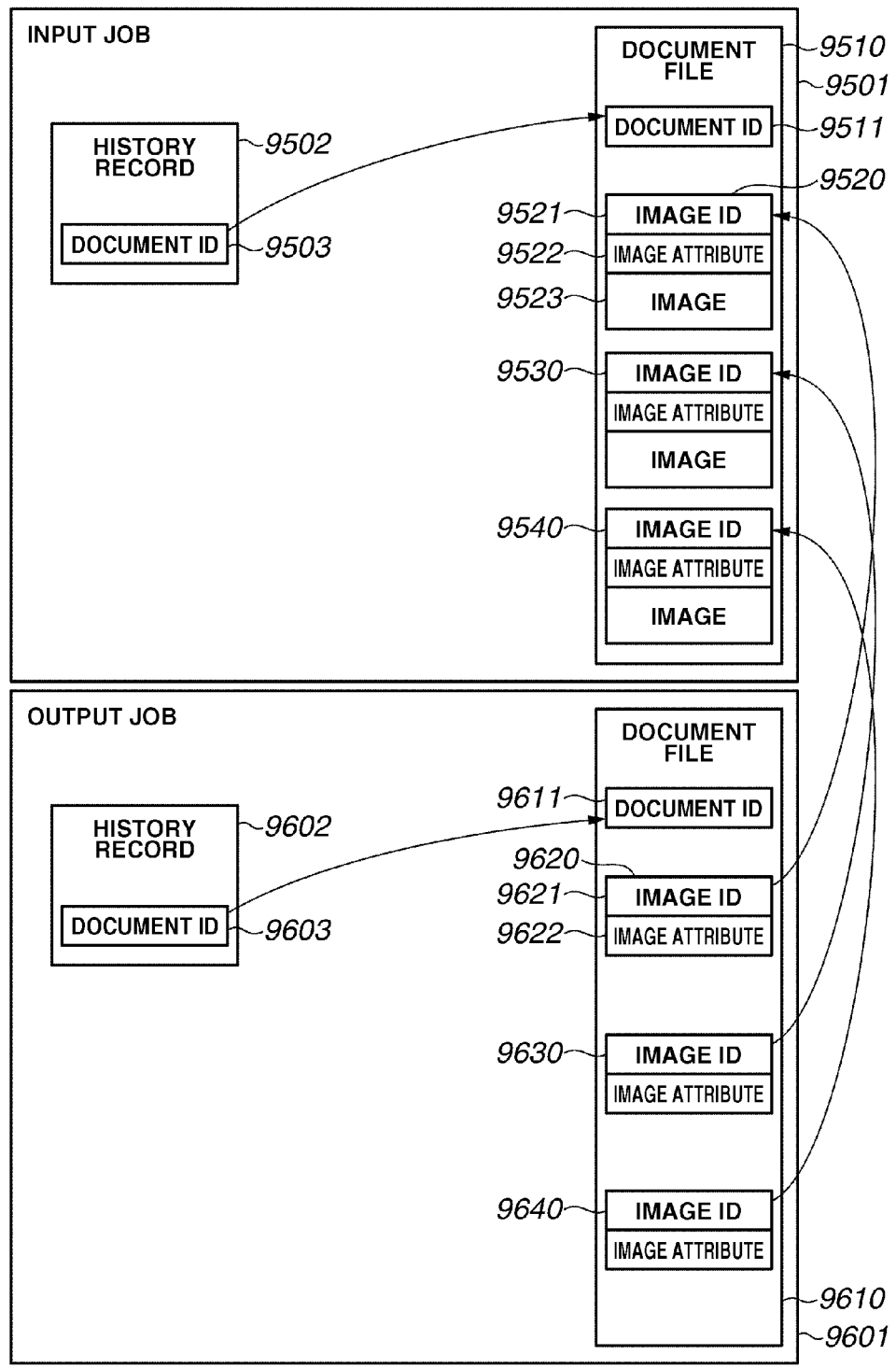
FIG. 10 is a diagram showing an example of writing in a history management server 1006 and a storage server 1005 according to a second embodiment of the present invention.

FIG. 10 shows an example of writing the data in a history management server 1006 and the storage server 1005 according to the second embodiment. In FIG. 10, in an input job 9501, the job type 7002 is an input job, e.g., a BOX storage job 7301. In an output job 9601, the job type 7002 is an output job, e.g., a BOX-PRINT job 7601. In other words, the output job 9601 is a job for outputting an image input by the input job 9501.

The input job 9501 records a history record 9502 in the history management server 1006, and a document file 9510 in the storage server 1005. The history record 9502 is constituted of items including a document ID 9503 described above with reference to FIG. 4. The document file 9510 is constituted of a document ID 9511 and image data 9520, 9530, and 9540. In FIG. 9, there are three image data. However, the number of image data may vary depending on job kinds. The document ID 9511 and the document ID 9503 have the same ID. Accordingly, the document file 9510 is linked with the history record 9502 to represent a correspondence.

The image data 9520 is written in the storage server 1005 in the step S805, and is constituted by an image ID 9521, an image attribute 9522, and an image 9523. The image ID is an ID unique for each page, and the image attribute 9522 is an image format or the like of the image 9523. The image 9523 is an image itself. In the storage server 1005, one document is constituted by one file, and a plurality of pages (images) can be provided. There is one unique document ID 9511 for one document.

The output job 9601 records a history record 9602 in the history management server 1006, and a document file 9610 in the storage server 1005. The history record 9602 includes a document ID 9603 described above with reference to FIG. 4. The document file 9610 is constituted by a document ID 9611 and image data 9620, 9630, and 9640. By the document ID 9611 and the document ID 9603, the document file 9610 is linked with the history record 9602 to represent a correspondence.

The image data 9620 is written in the storage server 1005 in the step S812, and is constituted by an image ID 9621 and an image attribute 9622, but no real image such as an image 9523 is present. The image ID 9621 shows a value equal to that of the image ID 9521 unique for each real image, indicating that a real image thus output is an image 9523. The image attribute 9622 is an image format or the like of the image 9523. An attribute that is changed with respect to the image 9523 during outputting such as a binding margin amount or header or footer information can be recorded.

Through the system of recoding the reference information of the image based on the image ID 9621 and the image ID 9521, the outputting is not accompanied by image recording in the storage server 1005. Accordingly, it is possible to reduce a recording amount and to prevent a reduction in job execution speed. Additionally, by recording the changed image attribute in the image attribute 9501 accompanying the execution of the output job 9601, it is possible to represent layout information of a binding margin or additional information of the header or the footer which are changed from the image 9523 of the input job 9501.

As described above, by the configuration and the processing of the second embodiment which executes reference information management by image units, a date, a place and a person of processing, and a type of processing can be efficiently recorded, and thus it is possible to limit a speed reduction during job execution to a minimum and to execute and record a great volume of jobs in the security unit. Moreover, the layout information or the additional information of the header or the footer which are changed during the outputting can be represented, whereby more accurate record can be kept.

Third Embodiment

A third embodiment of the present invention will be described below. The third embodiment will be described by way of job processing contents which take an output form called N in 1. The N in 1 means that an input image of N pages is laid out (synthesized) in one page that is to be output. In this case, when necessary, an image is reduced. A basic system configuration diagram, a basis system diagram, a security unit configuration, recorded contents of a history record, a data flowchart of each job kind, and an image storing method of the third embodiment are similar to those of the first embodiment described above with reference to FIG. 7, and thus description thereof will be omitted. A processing procedure during job execution according to the third embodiment where a job type 7002 is an input job, is similar to that of the flowchart of FIG. 8 of the first and second embodiments, and thus description thereof will be omitted.

Figure 11:
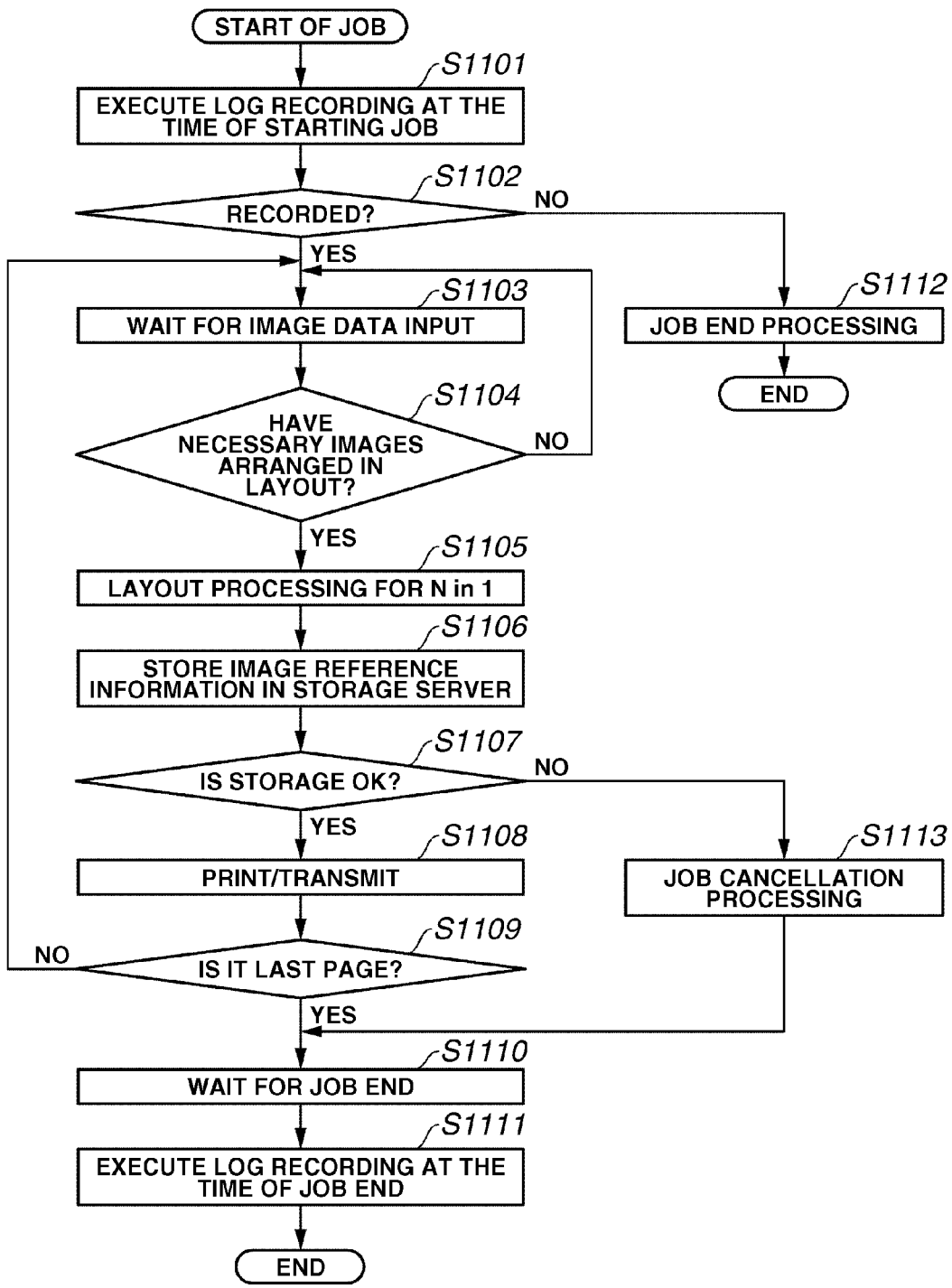
FIG. 11 is a flowchart showing a processing procedure during job execution which takes an output form of N in 1 according to a third embodiment of the present invention.

FIG. 11 is a flowchart showing the processing procedure during the job execution which takes the output form of N in 1 according to the third embodiment of the present invention. The process of the flowchart is executed by a CPU 2001 of a MFP 1001 or 1010.

First, upon a start of a job, log-recording at the job start time is executed (S1101). This processing is similar to that of the step S801 of FIG. 8.

Next, judgment is made as to whether the log-recording has normally been executed (step S1102). As a result, if it is judged that the log-recording has not normally been executed or a necessary area has not been secured (No), job end processing is executed without continuing the job execution (step S1112). Then, when the job end processing is completed, the process of the flowchart is finished. On the other hand, if it is judged in the step S1102 that the necessary area has been secured and the log-recording has normally been executed (Yes), the process proceeds to step S1103.

In the step S1103, the process waits for inputting of image data. Upon inputting of an image, the process proceeds to step S1104. Since the job of N in 1 of the third embodiment is an output job, the inputting becomes image reading from a HDD 2004. In the step S1104, judgment is made as to whether N images necessary for N in 1 have been prepared. The process proceeds to step S1105 if the images necessary for layout have been prepared (Yes), or returns to the step S1103 to wait for next image inputting if the images have not been prepared (No).

In the step S1105, layout processing of N in 1 is carried out. In this processing, an image of N pages is laid out in one page. When the layout processing ends, the process proceeds to step S1106.

In the step S1106, reference image of the image subjected to the layout processing is stored in a storage server 1005.

According to the third embodiment, as the reference information of the image is managed by an image unit, an input job that has input the same image as was previously executed, records in a storage server 1005 an ID identical to an image ID of the image stored in the storage server 1005. In the job of N in 1, since one image is created from a plurality of images, image ID'S indicating a plurality of images constituting the image subjected to the layout processing in the step S1105 are enumerated to be recorded. Accordingly, it is possible to specify an image processed by an output job of N in 1. In this case, information regarding where and what image is laid out is recorded together as an image attribute. Based on this attribute information, it is possible to easily reproduce the image of the same layout configuration later. When the processing of the step S1106 ends, the process proceeds to next step S1107.

Next, in the step S1107, judgment is made as to whether the data has been stored in the storage device 1005. As a result, the process proceeds to step S1108 if the storage is performed (Yes), or proceeds to step S1113 if the storage is not performed (No). In the step s1113, cancellation processing of the job is executed and the process proceeds to step S1110. Through this processing, it is possible to prevent transmission or printing/outputting of the image that has not been stored in the storage server 1005.

In the step S1108, the image subjected to the layout processing in the step S1105 is output. For example, if the job being executed is a print job, a print is output to a printer 2095, and transmission processing that uses a network I/F 2010 or a modem 2050 is executed if the job is a transmission job. Since the image storage in the storage server 1105 is checked in the step S1107, reference information and an image attribute of the image printed or transmitted are always stored in a security unit, enabling easy investigation later.

When the processing of the step S1108 ends, the process proceeds to step S1109. In the step S1109, judgment is made as to whether the image output in the step S1108 is a last page. As a result, the process proceeds to step S1110 if it is a last page (Yes), or returns to the step S1103 to wait for next image inputting when it is not a last page (No).

In the step S1110, the process waits for a job end. Then, in step S1111, log-recording processing of an item that could not be written because of its indefiniteness in the step S1101 such as a job end result 4008 is executed to the history management server 1006. When the log-recording ends, the process of the flowchart comes to an end.

Figure 12:
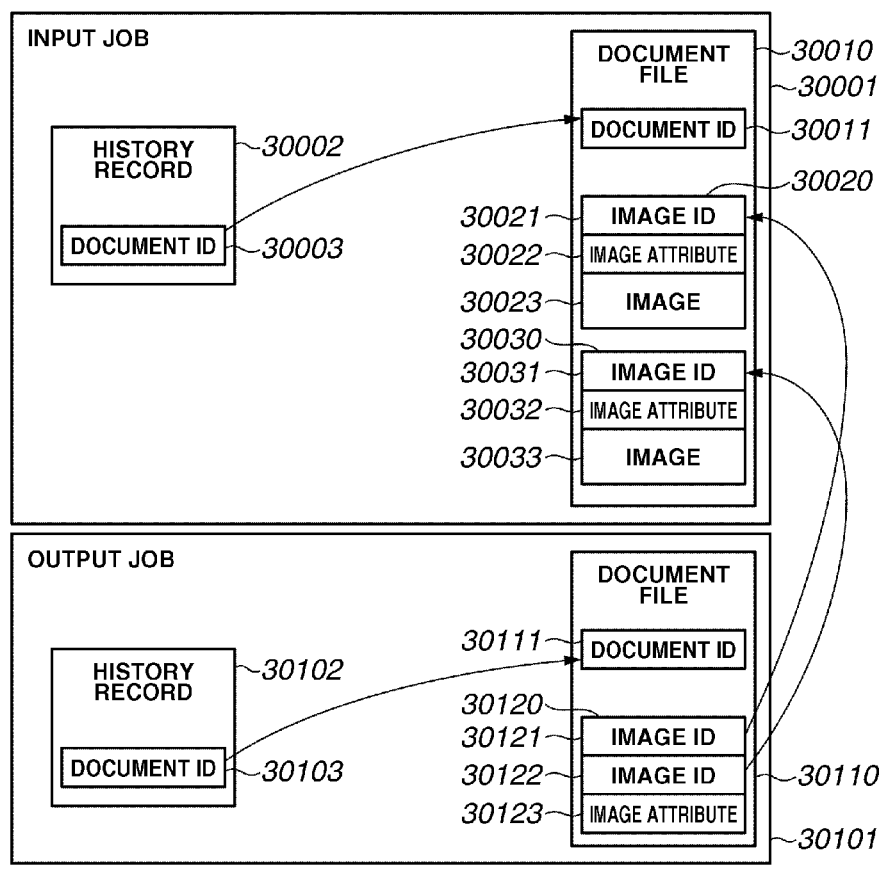
FIG. 12 is a diagram showing an example of writing in a history management server 1006 and a storage server 1005 according to the third embodiment.

FIG. 12 shows an example of writing the data in the history management server 1006 and the storage server 1005 according to the third embodiment.

In FIG. 12, in an input job 30001, a job type 7002 is an input job, e.g., a BOX storage job 7301. In an output job 30101, the job type 7002 is an output job, e.g., a BOX-PRINT job 7601. In other words, the output job 30101 is a job for outputting an image input by the input job 30001.

The input job 30001 records a history record 30002 in the history management server 1006, and a document file 30010 in the storage server 1005. The history record 30002 is constituted of items including a document ID 30003 described above with reference to FIG. 4. The document file 30010 is constituted of a document ID 30011 and image data 30020 and 30030. By the document ID 30011 and the document ID 30003, the document file 30010 is linked with the history record 30002 to represent a correspondence. The image data 30020 is written in the storage server 1005 in the step S805, and constituted of an image ID 30021, an image attribute 30022, and an image 30023. The image ID is an ID unique for each real image, and the image attribute 30022 is an image format or the like of the image 30023. The image 30023 is a real image. The image data 30030, an image ID 30031, an image attribute 30032, and an image 30033 are similar as described as to 30020 to 30023.

In the storage server 1005, one document contains one file, and a plurality of pages (images) can be provided. There is one unique document ID 30011 for one document.

The output job 30101 records a history record 30102 in the history management server 1006, and a document file 30110 in the storage server 1005. The history record 30102 is constituted of items including a document ID 30103 described above with reference to FIG. 4. The document file 30110 is constituted of a document ID 30111 and each image data 30120. By the document ID 30111 and the document ID 30103, the document file 30110 is linked with the history record 30102 to represent a correspondence.

The image data 30120 is written in the storage server 1005 in the step S1106, and constituted of an image ID 30121, an image ID 30122, and an image attribute 30123, but no real image such as an image 30023 or an image 30033 is present. The image ID 30121 and the image ID 30122 show values equal to those of an image ID 30021 and an image ID 30022 unique to each real image, which indicates that a real image thus output is constituted of an image 30023 and an image 30033. The image attribute 30123 is an image format or the like of the image 30023 and the image 30033.

When the layout of the N in 1 of the flowchart of FIG. 11 is executed, the two images, i.e., the image 30023 and the image 30033 are laid out in one page and outputted. Then, the layout information is recorded in the image attribute 30123. Through the system of recoding the reference information of the image based on the image ID 30121 and the image ID 30122, as well as the image ID 30021 and the image ID 30031, the outputting is not accompanied by image recording in the storage server 1005. Accordingly, it is possible to reduce a recording amount and to prevent a reduction in job execution speed. Additionally, by recording the image attribute that is changed in layout to N in 1, in the image attribute 30123 accompanying the execution of the output job 30101, it is possible to represent reduction information or layout information of an image that is changed from the image 30023 and the image 30033 of the input job 30001.

As described above, by the configuration and the processing of the third embodiment which executes reference information management by image units, a date, a place and a person of processing, and a type of processing can be efficiently recorded, and thus it is possible to limit a speed reduction during job execution to a minimum and to execute and record a great volume of jobs in the security unit. Moreover, the layout information changed during the outputting can be represented, whereby more accurate record can be kept.

Fourth Embodiment

A fourth embodiment of the present invention will be described below. The fourth embodiment will be described by way of job processing contents which take an output form called 1 to N. The 1 to N means that an input image of one page is divided into N pages and laid out for output. In this case, when necessary, an image is expanded. A basic system configuration diagram, a basis system diagram, a security unit configuration, recorded contents of a history record, a data flowchart of each job kind, and an image storing method of the fourth embodiment are similar to those of the first embodiment described above with reference to FIGS. 1 to 7, and thus description thereof will be omitted. A processing procedure during job execution where a job type 7002 is an input job according to the fourth embodiment is similar to that of the flowchart of FIG. 8 of the second embodiment, and thus description thereof will be omitted.

Figure 13:
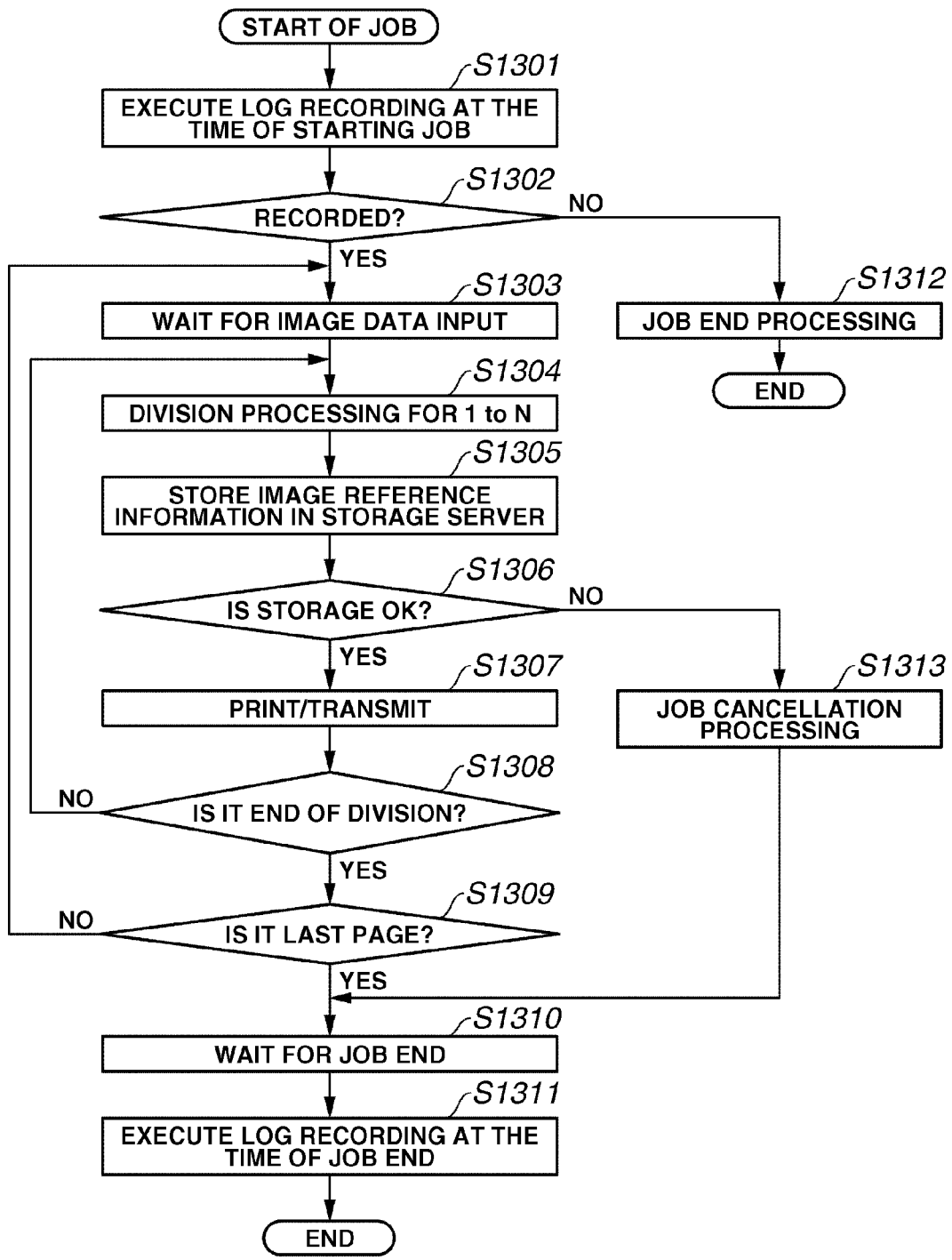
FIG. 13 is a diagram showing a processing procedure during job execution which takes an output form of 1 to N according to a fourth embodiment of the present invention.

FIG. 13 is a flowchart showing the processing procedure during the job execution which takes the output form of 1 to N according to the fourth embodiment of the present invention. The process of the flowchart is executed by a CPU 2001 of a MFP 1001 or 1010.

First, upon a start of a job, log-recording at the job start time is executed (S1301). This processing is similar to that of the step S801 of FIG. 8.

Next, judgment is made as to whether the log-recording has normally been executed (step S1302). As a result, if it is judged that the log-recording has not normally been executed or a necessary area has not been secured (No), the process proceeds to step S1312, and job end processing is executed without continuing the job execution. Then, when the job end processing is completed, the process of the flowchart is finished. On the other hand, if it is judged in the step S1302 that the necessary area has been secured and the log-recording has normally been executed (Yes), the process proceeds to step S1303.

In the step S1303, the process waits for inputting of image data. When an image is inputted, the process proceeds to step S1304. Since the job of 1 to N of the fourth embodiment is an output job, the inputting becomes image reading from a HDD 2004.

In the step S1304, division processing of 1 to N is executed. By this processing, an image of one page is divided and laid out into N pages. In this case, the image is not divided into N pages at once, but the image is divided one piece at a time. Then, after one division is prepared, the process proceeds to step S1305.

In the step S1305, reference image of the image of one page subjected to the division layout processing is stored in a storage server 1005. According to the fourth embodiment, since the reference information of the image is managed by an image unit, an input job that has input the same image as was previously executed, records in the storage server 1005 an ID identical to an image ID of the image stored in the storage server 1005. In the job of 1 to N, as a plurality of images are created from one image, an image ID indicating the image input in the step S1303 is recorded. In this case, division layout information of the step S1304 is recorded together as an image attribute. Based on this attribute information, 1 to N information of the image can be recorded, and it is possible to easily reproduce the image of the division layout configuration later. It is therefore possible to specify an image processed by the job of 1 to N. When the processing of the step S1305 ends, the process proceeds to next step S1306.

Next, in the step S1306, judgment is made as to whether the data has been stored in the storage device 1005. As a result, the process proceeds to step S1307 if the storage is performed (Yes), and proceeds to step S1313 if the storage is not performed (No). In the step S1313, cancellation processing of the job is executed and the process proceeds to step S1310. Through this processing, it is possible to prevent transmission or printing/outputting of the image that has not been stored in the storage server 1005.

In the step S1307, the image subjected to the division layout processing in the step S1304 is output. If the job being executed is a print job, a print is output to a printer 2095, and transmission processing that uses a network I/F 2010 or a modem. 2050 is executed if the job is a transmission job. Since the image storage in the storage serer 1105 is checked in the step S1306, reference information and an image attribute of the image printed or transmitted are always stored in a security unit, enabling easy investigation later. When the processing of the step S1307 ends, the process proceeds to step S1308.

In the step S1308, judgment is made as to whether the division processing of the step S1304 has all been executed for the image input in the step S1303. As a result, the process proceeds to step S1309 if predetermined division has been completed (Yes), and the process returns to the step 1304 to continue the division processing if not completed (No).

In the step S1309, judgment is made as to whether the image output in the step S1307 is a last page. As a result, the process proceeds to step S1310 if it is a last page (Yes), or returns to the step S1303 to wait for next image inputting when it is not a last page (No).

In the step S1310, the process waits for a job end. Then, in step S1311, log-recording processing of an item that could not be written because of its indefiniteness in the step S1301 such as a job end result 4008 is executed for the history management server 1006. When the log-recording ends, the process of the flowchart comes to an end.

Figure 14:
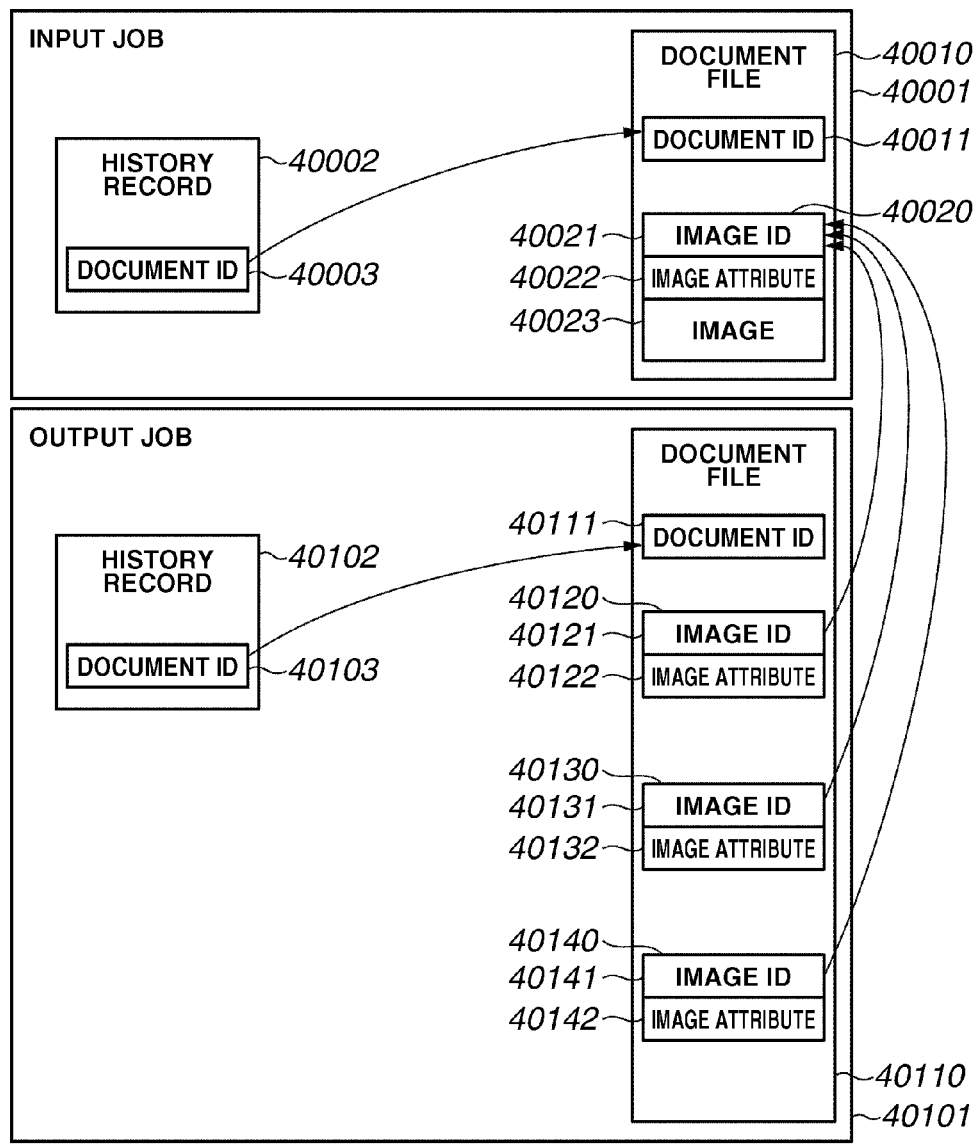
FIG. 14 is a diagram showing an example of writing in a history management server 1006 and a storage server 1005 according to the fourth embodiment.

FIG. 14 shows an example of writing the data in the history management server 1006 and the storage server 1005 according to the fourth embodiment. In FIG. 14, in an input job 40001, a job type 7002 is an input job, e.g., a FAX reception job 7401. In an output job 40101, the job type 7002 is an output job, e.g., a reception print job 7601. In other words, the output job 40101 is a job for outputting an image input by the input job 40001.

The input job 40001 records a history record 40002 in the history management server 1006, and a document file 40010 in the storage server 1005. The history record 40002 is constituted of items including a document ID 40003 described above with reference to FIG. 4. The document file 40010 is constituted of a document ID 40011 and each image data 40020. By the document ID 40011 and the document ID 40003, the document file 40010 is linked with the history record 40002 to represent a correspondence. The image data 40020 is written in the storage server 1005 in the step S805, and constituted of an image ID 40021, an image attribute 40022, and an image 40023. The image ID is an ID unique for each page, and the image attribute 40022 is an image format or the like of the image 40023. The image 40023 is a real image.

In the storage server 1005, one document contains one file, and a plurality of pages (images) can be provided. There is one unique document ID 40011 to one document.

The output job 40101 records a history record 40102 in the history management server 1006, and a document file 40110 in the storage server 1005. The history record 40102 is constituted of items including a document ID 40103 described above with reference to FIG. 4. The document file 40110 is constituted of a document ID 40111 and each image data 40120, 40130, and 40140. By the document ID 40111 and the document ID 40103, the document file 40110 is linked with the history record 40102 to represent a correspondence.

The image data 40120 is written in the storage server 1005 in the step S1305, and constituted of an image ID 40121, and an image attribute 40122, but no real image such as an image 40023 is present. The image ID 40121 shows a value equal to that the image ID 40021 unique to each real image. The image attribute 40122 is an image format or the like of the image 40023. When the division layout of the 1 to N of the flowchart of FIG. 13 is executed, the image 40023 is divided and laid out in N pages and outputted. Then, the division layout information is recorded in the image attribute 40122. According to the present embodiment, the long image of one page received by the FAX reception job 7401 is divided into three to be printed by the reception print job 7601. The image data 40120 indicates first data after the division of the image 40023 into three.

Similarly thereafter, 40130 denotes second image data after the division of the image 40023 into three, and 40140 denotes third image data. The image ID 40131 and the image ID 40141 show values equal to that of the image ID 40021. In the image attribute 40132 and the image attribute 40142, the division layout information created during the division processing of the step S1304 is recorded together with image format information of the image 40023.

Through the system of recoding the reference information of the image based on the image ID 40121 and the image ID 40131, the image ID 40141 and the image ID 40021, the outputting is not accompanied by image recording in the storage server 1005. Accordingly, it is possible to reduce a recording amount and to prevent a reduction in job execution speed. Additionally, by recording the image attribute changed in layout to 1 to N in the image attribute 40122, the image attributes 40132 and the image attribute 40142 together with the execution of the output job 40101, it is possible to represent expansion information or layout information of the image changed from the image 40023 of the input job 40001.

As described above, by the configuration and the processing of the fourth embodiment which executes reference information management by image units, a date, a place and a person of processing, and a type of processing can be efficiently recorded, and thus it is possible to limit a speed reduction during job execution to a minimum and to execute and record a great volume of jobs in the security unit. Moreover, the layout information changed during the outputting can be represented, whereby more accurate record can be kept.

Other Embodiments

The exemplary embodiments have been described in detail. Since the amount of recording necessary for image storage can be reduced as compared with the conventional technology, cost performance is improved. Moreover, since the same image information is held as linkage information, ease of retrieval is improved. Since the layout information is recorded in the attribute information of the image recorded together with the image or the reference information of the image, the image of the output time can be reproduced later even if a layout change such as expansion, reduction, synthesis or division is made. Thus, a more accurate record can be kept.

According to the present invention, for example, an embodiment can be employed as a system, an apparatus, a method, a program or a storage medium (recording medium). Specifically, the invention may be applied to a system constituted by a plurality of devices, or an apparatus constituted by one device.

The present invention includes a case where a software program (program corresponding to the flowchart of each of the embodiments) for realizing the functions of the embodiment is supplied to a system or an apparatus directly or from a remote place, and a computer of the system or the apparatus reads and executes the supplied program code.

Thus, the program code itself installed in the computer to realize the function processing of the present invention is also capable of realizing the invention. In other words, that the computer program itself realizes the functional processing of the invention is within the scope of the present invention.

In this case, as long as it has a program function, any form such as an object code, a program executed by an interpreter, or script data supplied to an OS can be employed.

As recording media for supplying programs, for example, a floppy (registered trademark) disk, a hard disk, an optical disk, a magneto-optical disk, a MO, a CD-ROM, a CD-R, a CD-RW, a magnetic tape, a nonvolatile memory card, a ROM, a DVD (DVD-ROM, DVD-R), and the like are available.

Additionally, as a program supplying method, a browser of a client computer can be used to connect to a homepage of Internet, and the computer program itself of the invention or a compressed file including an automatic installing function can be downloaded and supplied from the homepage in a recording mediums such as a hard disk. The program code constituting the program of the invention may be divided into a plurality of files, and each file may be downloaded from a different homepage. In other words, a WWW server that causes a plurality of users to download the program file to realize the functional processing of the invention by the computer is within the scope of the invention.

The program of the invention may be encrypted and stored in a storage medium such as a CD-ROM to be distributed to the users, the user who satisfies predetermined conditions may be permitted to download key information for description from the homepage through the Internet, and the encrypted program may be executed by using the key information to be installed in the computer.

The computer may execute the read program to realize the functions of each of the embodiments. The OS or the like operating on the computer may execute a part or all of the actual processing, thereby realizing the functions of the embodiments.

Furthermore, after the program read from the recording medium is written in a memory disposed in a function expansion board inserted into the computer or a function expansion unit connected to the computer, based on program instructions, a CPU or the like of the function expansion board or the function expansion unit may execute apart or all of actual processing, thereby realizing the functions of the embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An image processing apparatus which is able to communicate with a server, comprising:
    an image data storage unit configured to store image data;
    a job execution unit configured to execute an input job for inputting image data and storing the image data in the image data storage unit, and an output job for outputting the image data which is input by execution of the input job and is stored in the image data storage unit; and
    a controller configured to, in a case where the job executed by the job execution unit is the input job, transmit the image data which is input by the execution of the input job to the server for storing in the server the image data as log information of the input job, and in a case where the job executed by the job execution unit is the output job, transmit reference information for referring to the image data stored in the server by the execution of the input job to the server for storing in the server the reference information as the log information of the output job without transmitting to the server the image data output by execution of the output job.

2. The image processing apparatus according to claim 1, wherein the controller transmits, to the server, history information generated in accordance with the execution of the job by the job execution unit.

3. The image processing apparatus according to claim 1, wherein, when the job execution unit executes an output job to output synthesized image data generated by synthesizing a plurality of image data, the controller transmits, to the server, the reference information for referring to the plurality of image data stored in the server without transmitting the synthesized image data to the server.

4. The image processing apparatus according to claim 1, wherein, when the job execution unit executes an output job to output each of a plurality of divided image data obtained by dividing the image data, the controller transmits to, the server, the reference information for referring to the image data stored in the server without transmitting the plurality of divided image data to the server.

5. The image processing apparatus according to claim 1, wherein the controller transmits to the server the reference information for referring to the image data stored in the server by each page.

6. The image processing apparatus according to claim 1, wherein the controller transmits to the server the reference information for referring to the image data stored in the server by each document.

7. The image processing apparatus according to claim 1, wherein the controller processes the image data input by the execution of the input job to transmit the image data to the server for storing in the server the image data.

8. The image processing apparatus according to claim 1, wherein the image processing apparatus is able to communicate with the server via the network.

9. The image processing apparatus according to claim 1, wherein the job execution unit is further configured to execute the input job for reading a document, inputting the image data based on the read document, and storing the input image data corresponding to the read document in the image data storage unit.

10. The image processing apparatus according to claim 1, wherein the job execution unit is further configured to execute the input job for receiving the image data and storing the received image data in the image data storage unit.

11. The image processing apparatus according to claim 1, wherein the job execution unit is further configured to execute the output job for printing the image data which is input by execution of the input job and is stored in the image data storage unit.

12. The image processing apparatus according to claim 1, wherein the job execution unit is further configured to execute the output job for transmitting the image data which is input by execution of the input job and is stored in the image data storage unit.

13. The image processing apparatus according to claim 1, wherein, in a case where the job executed by the job execution unit is the input job, the controller compresses the image data which is input by the execution of the input job and transmits the compressed image data to the server.

14. A method of controlling an image processing apparatus which is able to communicate with a server, the method comprising:
    storing, in an image data storage unit, image data;
    executing, by a job executing unit, an input job for inputting image data and storing the image data in the image data storage unit, and an output job for outputting the image data which is input by execution of the input job and is stored in the image data storage unit; and
    controlling, by a controller, to, in a case where the executed job is the input job, transmit the image data which is input by execution of the input job to the server for storing in the server the image data as log information of the input job, and in a case where the executed job is the output job, transmit reference information for referring to the image data stored in the server by the execution of the input job to the server for storing in the server the reference information as the log information of the output job without transmitting to the server the image data output by execution of the output job.

15. A non-transitory computer-readable storage medium storing thereon a computer-executable program for executing the image processing method of claim 14 in the image processing apparatus.

\* \* \* \* \*